United States Patent
Han et al.

(10) Patent No.: US 11,880,754 B2
(45) Date of Patent: *Jan. 23, 2024

(54) ELECTRONIC APPARATUS AND CONTROL METHOD THEREOF

(71) Applicant: Samsung Electronics Co., Ltd., Suwon-si (KR)

(72) Inventors: Youngho Han, Suwon-si (KR); Kwangyoun Kim, Suwon-si (KR); Sangha Kim, Suwon-si (KR); Sungchan Kim, Suwon-si (KR); Sungsoo Kim, Suwon-si (KR); Kyungmin Lee, Suwon-si (KR); Yongchan Lee, Suwon-si (KR); Jaewon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/162,218

(22) Filed: Jan. 31, 2023

(65) Prior Publication Data

US 2023/0177398 A1 Jun. 8, 2023

Related U.S. Application Data

(63) Continuation of application No. 16/593,589, filed on Oct. 4, 2019, now Pat. No. 11,586,977.

(30) Foreign Application Priority Data

Oct. 5, 2018 (KR) .......................... 10-2018-0119054

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS 8,996,372 B1 3/2015 Secker-Walker et al.
9,293,134 B1 3/2016 Saleem et al.
(Continued)

FOREIGN PATENT DOCUMENTS

EP 3 376 361 A2 9/2018
JP 2003-140690 A 5/2003
(Continued)

OTHER PUBLICATIONS

International Search Report dated Jan. 17, 2020, issued in International Patent Application No. PCT/KR2019/013040.
(Continued)

*Primary Examiner* — Nicholas J Lee
(74) *Attorney, Agent, or Firm* — Jefferson IP Law, LLP

(57) ABSTRACT

An electronic apparatus and a control method thereof are provided. The control method of the electronic apparatus includes receiving, from a first external electronic apparatus and a second external electronic apparatus, a first artificial intelligence model and a second artificial intelligence model used by the first and second external electronic apparatuses, respectively, and a plurality of learning data stored in the first and second external electronic apparatuses, identifying first learning data, which corresponds to second learning data received from the second external electronic apparatus, among learning data received from the first external electronic apparatus, training the second artificial intelligence model used by the second external electronic apparatus (Continued)

based on the first learning data, and transmitting the trained second artificial intelligence model to the second external electronic apparatus.

20 Claims, 10 Drawing Sheets

(56) References Cited

U.S. PATENT DOCUMENTS

| | | |
|---|---|---|
| 9,514,740 B2 | 12/2016 | Jost et al. |
| 9,620,128 B2 | 4/2017 | Levien et al. |
| 2013/0317819 A1 | 11/2013 | Hakkani-Tur et al. |
| 2015/0161986 A1 | 6/2015 | Tickoo et al. |
| 2015/0193693 A1 | 7/2015 | Vasseur et al. |
| 2016/0267380 A1 | 9/2016 | Gemello et al. |
| 2017/0161603 A1 | 6/2017 | Okanohara et al. |
| 2017/0337487 A1 | 11/2017 | Nock et al. |

FOREIGN PATENT DOCUMENTS

| | | |
|---|---|---|
| JP | 2017-535857 A | 11/2017 |
| KR | 10-1065188 B1 | 9/2011 |
| KR | 10-2018-0096473 A | 8/2018 |

OTHER PUBLICATIONS

Mazalov et al., Writing on Clouds, Intelligent Computer Mathematics, Springer Berlin Heidelberg, Berlin, Heidelberg, pp. 402-416, XP047009048, Jul. 8, 2012.
Extended European Search Report dated Sep. 10, 2021, issued in European Patent Application No. 19869924.1.

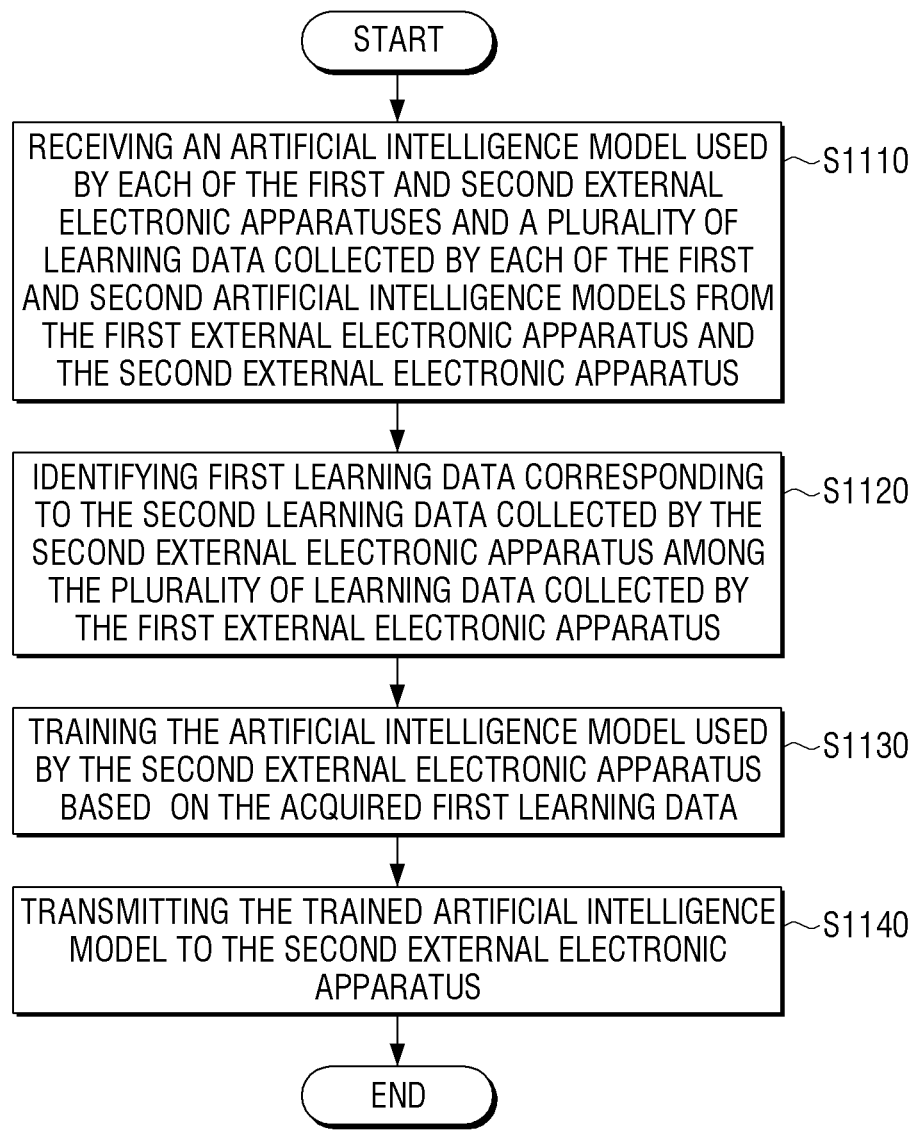

ELECTRONIC APPARATUS AND CONTROL METHOD THEREOF

CROSS-REFERENCE TO RELATED APPLICATION(S)

This application is a continuation application of prior application Ser. No. 16/593,589, filed on Oct. 4, 2019, which application is based on and claims priority under 35 U.S.C. § 119(a) of a Korean patent application number 10-2018-0119054, filed on Oct. 5, 2018 in the Korean Intellectual Property Office, the disclosure of which is incorporated by reference herein in its entirety.

BACKGROUND

1. Field

The disclosure relates to an electronic apparatus and a control method. More particularly, the disclosure relates to a method of training an artificial intelligence model of at least one external electronic apparatus among a plurality of external electronic apparatuses based on learning data stored in the plurality of external electronic apparatuses.

Also, the disclosure relates to an artificial intelligence (AI) system simulating functions of a human brain such as cognition and determination by utilizing a machine learning algorithm, and applications thereof.

2. Description of Related Art

An artificial intelligence (AI) system is a computer system implementing intelligence of a human level, and is a system wherein a machine learns, determines, and becomes smarter by itself, unlike rule-based smart systems. An artificial intelligence system shows a more improved recognition rate as it is used more, and becomes capable of understanding user preferences more correctly. For this reason, rule-based smart systems are gradually being replaced by deep learning-based artificial intelligence systems.

AI technology consists of machine learning (deep learning) and element technologies utilizing machine learning.

Machine learning refers to an algorithm technology of classifying/learning the characteristics of input data by itself. Meanwhile, an element technology refers to a technology utilizing a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Meanwhile, recently, various methods for using an AI model in a device having a small resource like a user device are being discussed. Further, a method for constructing a personalized AI model by training an AI model with data stored in a user device as learning data is also being discussed.

Recently, a user has various types of user devices. Various user devices, for example, smartphones, artificial intelligence speakers, digital TVs, refrigerators, etc. may include AI models. However, a problem has existed, which is that the amount of learning data collected by some user devices is insufficient, and is insufficient for training an AI model, or levels of learning vary for each user device, and accordingly, even if the same user uses a user device, the same result value of performance cannot be maintained.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to address the aforementioned problems, and relates to a method of sharing learning data among a plurality of external electronic apparatuses.

Additional aspects will be set forth in part in the description which follows and, in part, will be apparent from the description, or may be learned by practice of the presented embodiments.

In accordance with an aspect of the disclosure, a control method of an electronic apparatus for achieving the aforementioned purpose is provided. The control method includes receiving, from a first external electronic apparatus and a second external electronic apparatus, a first artificial intelligence model and a second artificial intelligence model used by the first and second external electronic apparatuses, respectively, and a plurality of learning data stored in the first and second external electronic apparatuses, identifying first learning data, which corresponds to second learning data received from the second external electronic apparatus, among learning data received from the first external electronic apparatus, training the second artificial intelligence model used by the second external electronic apparatus based on the first learning data, and transmitting the trained second artificial intelligence model to the second external electronic apparatus.

The control method may further include receiving first and second characteristic information of the first and second external electronic apparatuses, respectively, based on the first characteristic information of the first external electronic apparatus and the second characteristic information of the second external electronic apparatus, converting the first learning data into third learning data to train the second artificial intelligence model used by the second external electronic apparatus, and training the second artificial intelligence model used by the second external electronic apparatus based on the third learning data.

Also, in the identifying, at least one of an input value or a label value included in the second learning data may be compared with an input value and a label value included in the learning data received from the first external electronic apparatus and the first learning data may be acquired.

The second artificial intelligence model may be an artificial intelligence model for voice recognition, and the plurality of learning data may include voice data, a label value of the voice data, and user information corresponding to the voice data.

Also, in the identifying, at least one of second voice data, a second label value of the second voice data, or second user information corresponding to the second voice data included in the second learning data may be compared with at least one of first voice data, a first label value of the first voice data, and first user information corresponding to the first voice data included in the learning data received from the first external electronic apparatus and the first learning data may be acquired.

The first and second characteristic information may include at least one of characteristic information related to voice inputters included in the first and second external electronic apparatuses, characteristic information related to noises input through the voice inputters of the first and second external electronic apparatuses, or characteristic information related to distances between a location where a user voice was generated and locations of the first and second external electronic apparatuses.

Meanwhile, in the converting, voice data included in the first learning data may be converted by using a frequency filter.

Also, in the receiving, based on a predetermined time condition, the first and second artificial intelligence models used by the first and second external electronic apparatuses, respectively, the plurality of learning data stored in the first and second external electronic apparatuses, and first and second characteristic information of the first and second external electronic apparatuses, respectively, may be received.

Meanwhile, an electronic apparatus according to an embodiment of the disclosure includes a memory, a communicator, and a processor configured to receive, via the communicator from a first external electronic apparatus and a second external electronic apparatus, a first artificial intelligence model and a second artificial intelligence model used by the first and second external electronic apparatuses, respectively, and a plurality of learning data stored in the first and second external electronic apparatuses, identify first learning data, which corresponds to second learning data received from the second external electronic apparatus, among learning data received from the first external electronic apparatus, train the second artificial intelligence model used by the second external electronic apparatus based on the first learning data, and transmit, via the communicator, the trained second artificial intelligence model to the second external electronic apparatus.

Here, the processor may receive, via the communicator, first and second characteristic information of the first and second external electronic apparatuses, respectively, based on the first characteristic information of the first external electronic apparatus and the second characteristic information of the second external electronic apparatus, convert the first learning data into third learning data to train the second artificial intelligence model used by the second external electronic apparatus, and train the second artificial intelligence model used by the second external electronic apparatus based on the third learning data.

Also, the processor may compare at least one of an input value or a label value included in the second learning data with an input value and a label value included in the learning data received from the first external electronic apparatus and acquire the first learning data.

The second artificial intelligence model may be an artificial intelligence model for voice recognition, and the plurality of learning data may include voice data, a label value of the voice data, and user information corresponding to the voice data.

Also, the processor may compare at least one of second voice data, a second label value of the second voice data, or second user information corresponding to the second voice data included in the second learning data with at least one of first voice data, a first label value of the first voice data, and first user information corresponding to the first voice data included in the learning data received from the first external electronic apparatus and acquire the first learning data.

The first and second characteristic information may include at least one of characteristic information related to voice inputters included in the first and second external electronic apparatuses, characteristic information related to noises input through the voice inputters of the first and second external electronic apparatuses, or characteristic information related to distances between a location where a user voice was generated and locations of the first and second external electronic apparatuses.

Also, the processor may convert voice data included in the first learning data by using a frequency filter.

The processor may, based on a predetermined time condition, receive, via the communicator, the first and second artificial intelligence models used by the first and second external electronic apparatuses, respectively, the plurality of learning data stored in the first and second external electronic apparatuses, and first and second characteristic information of the first and second external electronic apparatuses, respectively.

Meanwhile, an electronic apparatus according to an embodiment of the disclosure includes a memory, a communicator, and a processor configured to receive, via the communicator from external electronic apparatuses, a plurality of learning data stored in the external electronic apparatuses, identify first learning data corresponding to second learning data stored in the electronic apparatus among the plurality of learning data received from the external electronic apparatuses, and train an artificial intelligence model used by the electronic apparatus based on the identified first learning data.

The processor may receive, via the communicator, characteristic information of the external electronic apparatuses, based on the characteristic information of the external electronic apparatuses and characteristic information of the electronic apparatus, convert the first learning data into third learning data to train the artificial intelligence model used by the electronic apparatus, and train the artificial intelligence model used by the electronic apparatus based on the third learning data.

Also, the processor may compare at least one of an input value or a label value included in the second learning data with an input value and a label value included in the plurality of learning data received from the external electronic apparatuses and identify the first learning data.

The characteristic information of the electronic apparatus and the external electronic apparatuses may include at least one of characteristic information related to voice inputters of the electronic apparatus and the external electronic apparatuses, characteristic information related to noises input through the voice inputters of the electronic apparatus and the external electronic apparatuses, or characteristic information related to distances between a location where a user voice was generated and locations of the electronic apparatus and the external electronic apparatuses.

According to the aforementioned various embodiments of the disclosure, an electronic apparatus can provide learning data suitable for an external electronic apparatus wherein personalized learning data is insufficient, and train an artificial intelligence model by using the provided learning data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 is a flow chart illustrating a control method of an electronic apparatus according to an embodiment of the disclosure.

Throughout the drawings, like reference numerals will be understood to refer to like parts, components, and structures.

DETAILED DESCRIPTION

Figure 1:
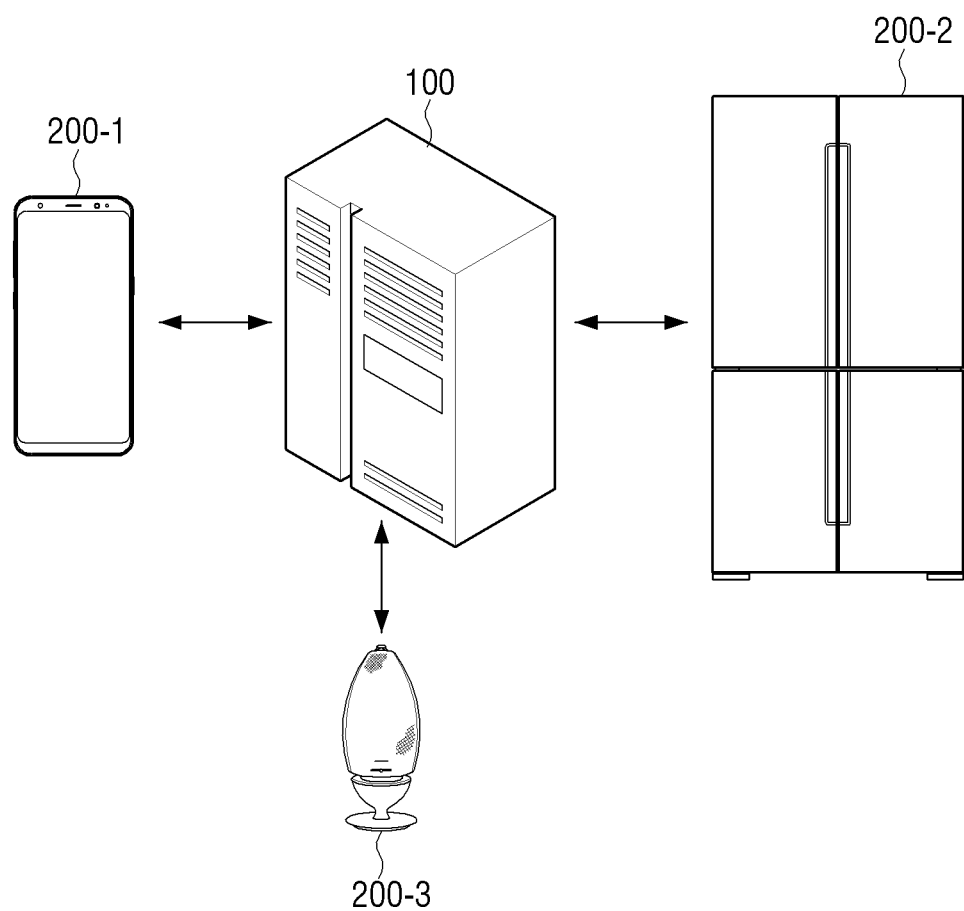
FIG. 1 is a diagram schematically illustrating an embodiment of the disclosure.

The following described with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, expressions such as "have," "may have," "include," and "may include" should be construed as denoting that there are such characteristics (e.g., elements such as numerical values, functions, operations and components), and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases: (1) including at least one A, (2) including at least one B, or (3) including at least one A and at least one B.

Further, the expressions "first," "second," and the like used in the disclosure may be used to describe various elements regardless of any order and/or degree of importance. Also, such expressions are used only to distinguish one element from another element, and are not intended to limit the elements.

Also, the description in the disclosure that one element (e.g., a first element) is "(operatively or communicatively) coupled with/to" or "connected to" another element (e.g., a second element) should be interpreted to mean that the one element may be directly coupled to the another element, or the one element may be coupled to the another element through another element (e.g., a third element). In contrast, the description that one element (e.g., a first element) is "directly coupled" or "directly connected" to another element (e.g., a second element) can be interpreted to mean that another further element (e.g., a third element) does not exist between the one element and other element.

In addition, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

An electronic apparatus according to various embodiments of the disclosure may include, at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a medical instrument, a camera, or a wearable device. Meanwhile, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit. Also, in some embodiments, an electronic apparatus according to various embodiments of the disclosure may include at least one of, for example, a television, a digital versatile disk (DVD) player, an audio, a refrigerator, an air conditioner, a cleaner, an oven, a microwave oven, a washing machine, an air cleaner, a set top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic photo frame.

According to another embodiment of the disclosure, an electronic apparatus may include at least one of various types of medical instruments (e.g., various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or a household robot, a drone, an automated teller machine (ATM) of a financial institution, a point of sales (POS) of a store, or an Internet of things (IoT) device (e.g., a light bulb, various types of sensors, a sprinkler device, a fire alarm, a thermostat, a street light, a toaster, exercise equipment, a hot water tank, a heater, a boiler, etc.).

Also, in the disclosure, the term "user" may refer to a person who uses an electronic apparatus or an apparatus using an electronic apparatus (e.g., an artificial intelligence electronic apparatus).

Meanwhile, in the disclosure, a first artificial intelligence model may mean an artificial intelligence model used by a first external electronic apparatus or an artificial intelligence model received from a first external electronic apparatus, and a second artificial intelligence model may mean an artificial intelligence model used by a second external electronic apparatus or an artificial intelligence model received from a second external electronic apparatus.

Meanwhile, in the disclosure, first learning data may mean learning data stored in a first external electronic apparatus, and second learning data may mean learning data stored in a second external electronic apparatus.

Hereinafter, the disclosure will be described in more detail with reference to the accompanying drawings.

FIG. 1 is a diagram schematically illustrating an embodiment of the disclosure.

Referring to FIG. 1, a plurality of external electronic apparatuses (e.g., a first external electronic apparatus 200-1, a second external electronic apparatus 200-2, and a third external electronic apparatus 200-3) may communicate with an electronic apparatus 100. The plurality of external electronic apparatuses may include artificial intelligence models, and may be apparatuses for providing various services by using artificial intelligence models. Here, artificial intelligence models used by the plurality of external electronic apparatuses may vary according to the purpose of each of the plurality of external electronic apparatuses. For example, an artificial intelligence model may vary such as an artificial intelligence model for voice recognition, an artificial intelligence model for image analysis, etc. The electronic apparatus 100 is an apparatus for training artificial intelligence models used by the plurality of external electronic apparatuses.

Specifically, the electronic apparatus 100 may store artificial intelligence models used by the plurality of external electronic apparatuses, and data necessary for training the artificial intelligence models. Specifically, the electronic apparatus 100 may receive the artificial intelligence model of each of the plurality of external electronic apparatuses from the plurality of external electronic apparatuses, and store the models. Here, the artificial intelligence model of each of the plurality of external electronic apparatuses may be an artificial intelligence model trained based on learning data of each of the plurality of external electronic apparatuses. However, the disclosure is not limited thereto, and the electronic apparatus 100 can receive an artificial intelligence model used by each of the plurality of external electronic apparatuses from an external server, and store the model.

Meanwhile, the electronic apparatus 100 may receive learning data from each of the plurality of external electronic apparatuses, and store the data. Here, the electronic apparatus 100 may classify artificial intelligence models and learning data received from each of the plurality of external electronic apparatuses by each external electronic apparatus, and store them.

The electronic apparatus 100 may train the artificial intelligence model used by each of the plurality of external electronic apparatuses based on the learning data received from each of the plurality of external electronic apparatuses. For example, the electronic apparatus 100 may train the first artificial intelligence model used by the first external electronic apparatus 200-1 based on the learning data received from the first to third external electronic apparatuses 200-1 to 200-3. By the same method, the electronic apparatus 100 may train the second artificial intelligence model used by the second external electronic apparatus 200-2 based on the learning data received from the first to third external electronic apparatuses 200-1 to 200-3. Also, by the same method, the electronic apparatus 100 may train the third artificial intelligence model used by the third external electronic apparatus 200-3 based on the learning data received from the first to third external electronic apparatuses 200-1 to 200-3.

Through the aforementioned method, the plurality of external electronic apparatuses may share learning data stored in each of the apparatuses and construct personalized artificial intelligence models. Also, for example, the first external electronic apparatus 200-1 is an apparatus where there is a lot of stored learning data. In addition, in case the learning data stored in the second external electronic apparatus 200-2 and the third external electronic apparatus 200-3 is small compared to the first external electronic apparatus 200-1, there would be an effect that the second external electronic apparatus 200-2 and the third external electronic apparatus 200-3 can train artificial intelligence models by using the learning data stored from the first external electronic apparatus 200-1 for solving the problem of insufficient learning data.

Meanwhile, artificial intelligence models sharing learning data as mentioned above may be artificial intelligence models performing similar functions. For example, all of the first to third artificial intelligence models may be artificial intelligence models related to voice recognition. Alternatively, all of the first to third artificial intelligence models may be artificial intelligence models for image analysis. However, the disclosure is not limited thereto, and in case there is a need to share learning data, learning data stored by artificial intelligence models different from one another can be shared by the plurality of external electronic apparatuses.

Meanwhile, the electronic apparatus 100 can train artificial intelligence models of the plurality of external electronic apparatuses by using an external server storing various learning data. In this case, training artificial intelligence models by using all of the learning data of the external server has a disadvantage that a large amount of resources are needed. Accordingly, the electronic apparatus 100 may select learning data similar to the learning data included in the first to third external electronic apparatuses 200-1 to 200-3 among the vast amount of learning data stored by the external server, and train artificial intelligence models based on the selected learning data.

Hereinafter, various embodiments of the disclosure will be described based on the first external electronic apparatus 200-1 and the second external electronic apparatus 200-2 among the plurality of external electronic apparatuses. Meanwhile, the technical idea of the disclosure can be applied to two or more external electronic apparatuses.

Figure 2:
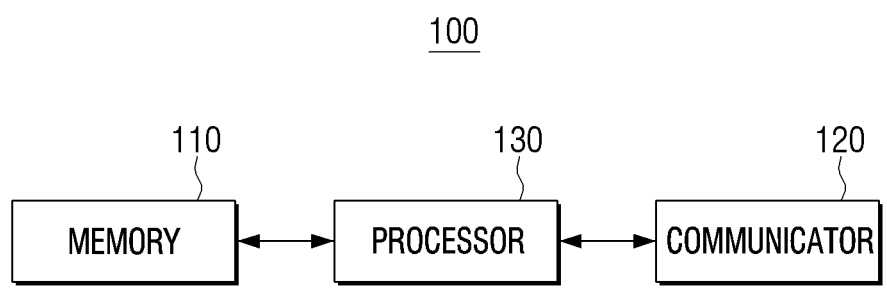
FIG. 2 is a block diagram illustrating a schematic configuration of an electronic apparatus according to an embodiment of the disclosure.

FIG. 2 is a block diagram illustrating a schematic configuration of an electronic apparatus according to an embodiment of the disclosure.

The electronic apparatus 100 may include a memory 110, a communicator 120, and a processor 130.

The memory 110 may store instructions or data related to at least one other different component of the electronic apparatus 100. In particular, the memory 110 may be implemented as a nonvolatile memory, a volatile memory, a flash memory, a hard disk drive (HDD), or a solid state drive (SSD), etc. The memory 110 may be accessed by the processor 130, and reading/recording/correction/deletion/update, etc. of data by the processor 130 may be performed. In the disclosure, the term memory may include the memory 110, the read-only memory (ROM) (not shown) and random access memory (RAM) (not shown) inside the processor 130, or a memory card (not shown) mounted on the electronic apparatus 100 (e.g., a micro secure digital (SD) card, a memory stick).

In addition, the memory 110 may receive artificial intelligence models used by the first external electronic apparatus 200-1 and the second external electronic apparatus 200-2 from the first external electronic apparatus 200-1 and the second external electronic apparatus 200-2, and learning data stored in the first external electronic apparatus 200-1 and the second external electronic apparatus 200-2. Further, the memory 110 may receive information on characteristic information of the first external electronic apparatus 200-1 and the second external electronic apparatus 200-2, and store the information. Here, characteristic information of the first external electronic apparatus 200-1 and the second external electronic apparatus 200-2 may include at least one of characteristic information related to the voice inputters included in the first external electronic apparatus 200-1 and the second external electronic apparatus 200-2, characteristic information related to noises input through the voice inputters of the first external electronic apparatus 200-1 and the second external electronic apparatus 200-2, or characteristic information related to the distance between a location wherein a user voice was generated and the first external electronic apparatus 200-1 and the second external electronic apparatus 200-2.

The communicator 120 is a component for performing communication with another electronic apparatus. Meanwhile, communicative connection of the communicator 120 with another electronic apparatus may include communication through a third apparatus (e.g., a repeater, a hub, an access point, a server, a gateway, etc.). Wireless communication may include cellular communication using at least one of long term evolution (LTE), LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of Wi-Fi, Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard 232 (RS-232), power line communication, or a plain old telephone service (POTS). Networks wherein wireless communication or wired communication is performed may include at least one of a telecommunication network, for example, a computer network (e.g., a local area network (LAN) or a wide area network (WAN)), Internet, or a telephone network.

Specifically, the communicator 120 may receive artificial intelligence models used by the first external electronic apparatus 200-1 and the second external electronic apparatus 200-2 from the first external electronic apparatus 200-1 and the second external electronic apparatus 200-2, and learning data stored in the first external electronic apparatus 200-1 and the second external electronic apparatus 200-2.

The processor 130 may be electronically connected with the memory 110, and control the overall operations and functions of the electronic apparatus 100.

Specifically, the processor 130 may identify first learning data corresponding to second learning data received from the second external electronic apparatus 200-2 among a plurality of learning data received from the first external electronic apparatus 200-1, and train the artificial intelligence model used by the second external electronic apparatus 200-2 based on the identified first learning data. In this case, the first external electronic apparatus 200-1 may be an external server including a vast amount of learning data, and the second external electronic apparatus 200-2 may be a user terminal.

Meanwhile, the processor 130 may receive characteristic information of each of the first external electronic apparatus 200-1 and the second external electronic apparatus 200-2 from the first external electronic apparatus 200-1 and the second external electronic apparatus 200-2. The electronic apparatus 100 may convert the first learning data into third learning data for training the second artificial intelligence model based on the characteristic information of the first external electronic apparatus 200-1 and the second external electronic apparatus 200-2.

As an example, in case the second artificial intelligence model is an artificial intelligence model for voice recognition, learning data may be data for a user voice. Here, user voices received by the first external electronic apparatus 200-1 and the second external electronic apparatus 200-2 may vary according to characteristic information of each external electronic apparatus. For example, a case where the first external electronic apparatus 200-1 is a user terminal such as a smartphone, and the second external electronic apparatus 200-2 is a refrigerator may be assumed. The first external electronic apparatus 200-1 and the second external electronic apparatus 200-2 may be different from each other in the types of microphones included inside the apparatuses, the number of microphones, etc., and also, the distances from the starting point of a user voice to the external electronic apparatuses may be different. Accordingly, the noise, frequency characteristics, etc. included in a user voice received by the first external electronic apparatus 200-1 may be different from the noise, frequency characteristics, etc. included in a user voice received by the second external electronic apparatus 200-2. Thus, in case the electronic apparatus 100 is going to use the second artificial intelligence model, there is a need to convert the first learning data to suit the characteristics of the second external electronic apparatus 200-2. Accordingly, the processor 130 may convert the first learning data into third learning data for training the second artificial intelligence model based on the characteristic information of the first external electronic apparatus 200-1 and the second external electronic apparatus 200-2.

In the aforementioned embodiment, a case where an artificial intelligence model is for voice recognition was described. However, in the case of an artificial intelligence model performing a different function, the same technical idea can be applied depending on needs.

Meanwhile, the processor 130 may compare at least one of an input value or a label value included in the second learning data with an input value and a label value included in each of the plurality of learning data received from the first external electronic apparatus 200-1 and acquire first learning data. Specifically, in case the first external electronic apparatus 200-1 is an external server including a vast amount of learning data, the electronic apparatus 100 may identify learning data for training the second artificial intelligence model, among the learning data of the first external electronic apparatus 200-1. In this case, the electronic apparatus 100 may identify learning data similar to the input value and the label value of the second learning data from the plurality of learning data of the first external electronic apparatus 200-1.

As an example, in case the first and second artificial intelligence models are artificial intelligence models for voice recognition, the first and second learning data may include user voice data, a label value of the voice data, and user information corresponding to the voice data. Here, an input value may be data related to an acoustic model, and a label value may be data related to a language model, and user information may be user identification information. Specifically, an input value may be data such as the waveform of a user voice, and may include data such as intonation and tone, and a label value may be text data wherein a user voice was converted into a text. Also, for identifying learning data similar to the input value and the label value of the second learning data from the plurality of learning data of the first external electronic apparatus 200-1, the electronic apparatus 100 may identify whether waveforms of input values are similar, or distribution of label values expressed in a vector format exists within a predetermined distance.

Meanwhile, the processor 130 may convert voice data included in the first learning data by using a frequency filter. Specifically, the processor 130 may acquire a frequency filter that can generate voice data appropriate for the second external electronic apparatus 200-2 based on characteristic information of the first external electronic apparatus 200-1 and characteristic information of the second external electronic apparatus 200-2, and acquire third learning data by using the acquired filter.

Also, the processor 130 may perform the aforementioned operations in case a predetermined time condition is satisfied. For example, the processor 130 may receive learning data from the first external electronic apparatus 200-1 and the second external electronic apparatus 200-2 around dawn and train the first artificial intelligence model and the second artificial intelligence model.

Meanwhile, according to another embodiment of the disclosure, the first artificial intelligence model and the second artificial intelligence model may be artificial intelligence models for understanding of natural languages. In this case, learning data may be information on the purport of a user voice and a slot included in a result of voice recognition acquired through a voice recognition model.

Figure 3:
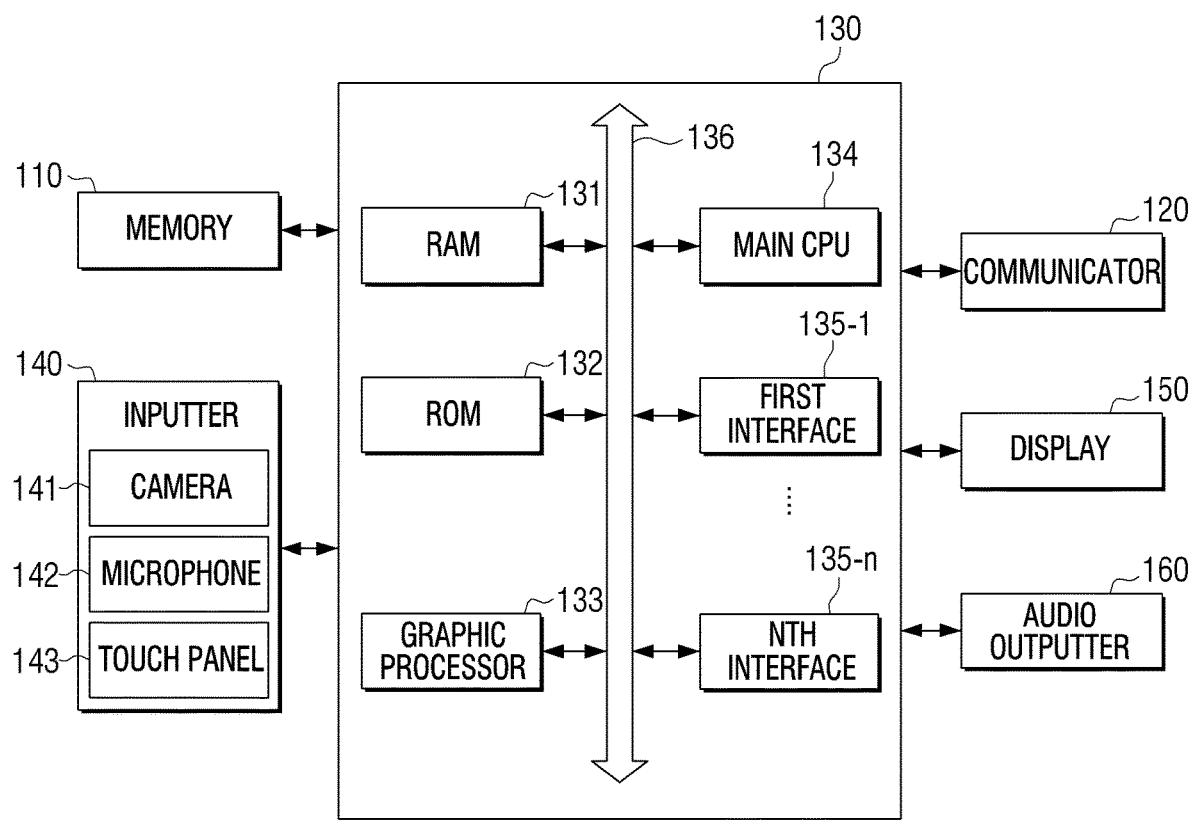
FIG. 3 is a block diagram illustrating a detailed configuration of an electronic apparatus according to an embodiment of the disclosure.

FIG. 3 is a block diagram illustrating a detailed configuration of an electronic apparatus according to an embodiment of the disclosure.

Referring to FIG. 3, the electronic apparatus 100 may further include an inputter 140, a display 150, and an audio outputter 160 in addition to the memory 110, the communicator 120, and the processor 130. However, the components are not limited to the aforementioned components, and some components may be added or omitted depending on needs.

The inputter 140 is a component for receiving input of a user instruction. Here, the inputter 140 may include a camera 141, a microphone 142, a touch panel 143, etc. The camera 141 is a component for acquiring image data around the electronic apparatus 100. The camera 141 may photograph a still image and a moving image. For example, the camera 141 may include one or more image sensors (e.g., a front surface sensor or a back surface sensor), a lens, an image signal processor (ISP), or a flash (e.g., a light emitting diode (LED), a xenon lamp, etc.). The microphone 142 is a component for acquiring sounds around the electronic apparatus 100. The microphone 142 may receive input of an acoustic signal outside, and generate electronic voice information. Also, the microphone 142 may use various noise removal algorithms for removing noises generated in the process of receiving input of an acoustic signal outside. The touch panel 143 is a component for receiving various user inputs. The touch panel 143 may receive input of data by a user manipulation. Also, the touch panel 143 may be constituted while being combined with the display that will be described below. Meanwhile, it is obvious that the inputter 140 may include various components for receiving input of various data in addition to the camera 141, the microphone 142, and the touch panel 143.

The aforementioned various components of the inputter 140 may be used in various forms. For example, in case the first external electronic apparatus 200-1 includes a voice recognition model, but the second external electronic apparatus 200-2 does not include a voice recognition model, and the second external electronic apparatus 200-2 needs a result for voice recognition, the electronic apparatus 100 may input a user voice input through the microphone 142 into the first artificial intelligence model received from the first external electronic apparatus 200-1 and output a result value, and transmit the value to the second external electronic apparatus 200-2. That is, the electronic apparatus 100 may not only share learning data between the first external electronic apparatus 200-1 and the second external electronic apparatus 200-2, but also acquire a result value for an input value of an artificial intelligence model not included in each external electronic apparatus instead of the external electronic apparatuses, and transmit the result value.

The display 150 is a component for outputting various images. The display 150 for providing various images may be implemented as display panels in various forms. For example, the display panel may be implemented as various display technologies such as a liquid crystal display (LCD), organic light emitting diodes (OLEDs), an active-matrix organic light-emitting diode (AM-OLED), liquid crystal on silicon (LcoS), digital light processing (DLP), etc. Also, the display 150 may be combined with at least one of the front surface area, the side surface area, or the back surface area of the electronic apparatus 100, in the form of a flexible display.

Specifically, the display 150 may display various setting information for sharing learning data among external electronic apparatuses. That is, sharing of learning data among external electronic apparatuses may be performed automatically, but may also be performed by a user instruction, and the display 150 may output various information for receiving input of a user instruction or inquiring about a user instruction.

The audio outputter 160 is a component outputting various kinds of notification sounds or voice messages as well as various types of audio data for which various processing operations such as decoding or amplification, noise filtering, etc. were performed by an audio processor. The audio processor is a component performing processing of audio data. At the audio processor, various processing such as decoding or amplification, noise filtering, etc. of audio data may be performed. Audio data processed at the audio processor may be output to the audio outputter 160. In particular, the audio outputter may be implemented as a speaker, but this is merely an example, and the audio outputter may be implemented as an output terminal that can output audio data.

The processor 130 controls the overall operations of the electronic apparatus 100, as described above. The processor 130 may include a RAM 131, a ROM 132, a main CPU 134, a graphic processor 133, first to nth interfaces 135-1 to 135-n, and a bus 136. Here, the RAM 131, the ROM 132, the main CPU 134, the graphic processor 133, and the first to nth interfaces 135-1 to 135-n may be connected with one another through the bus 136.

The ROM 132 stores a set of instructions, etc. for system booting. When a turn-on instruction is input and power is supplied, the main CPU 134 copies an operating system (O/S) stored in the memory in the RAM 131 according to the instruction stored in the ROM 132, and boots the system by executing the O/S. When booting is completed, the main CPU 134 copies various types of application programs stored in the memory in the RAM 131, and performs various types of operations by executing the application programs copied in the RAM 131.

Specifically, the main CPU 134 accesses the memory 110, and performs booting by using the O/S stored in the memory 110. Then, the main CPU 134 performs various operations by using various programs, contents, data, etc. stored in the memory 110.

The first to nth interfaces 135-1 to 135-n are connected with the aforementioned various components. One of the interfaces may be a network interface connected to an external electronic apparatus through a network.

Hereinafter, various embodiments according to the disclosure will be described with reference to FIGS. 4 to 8.

Figure 4:
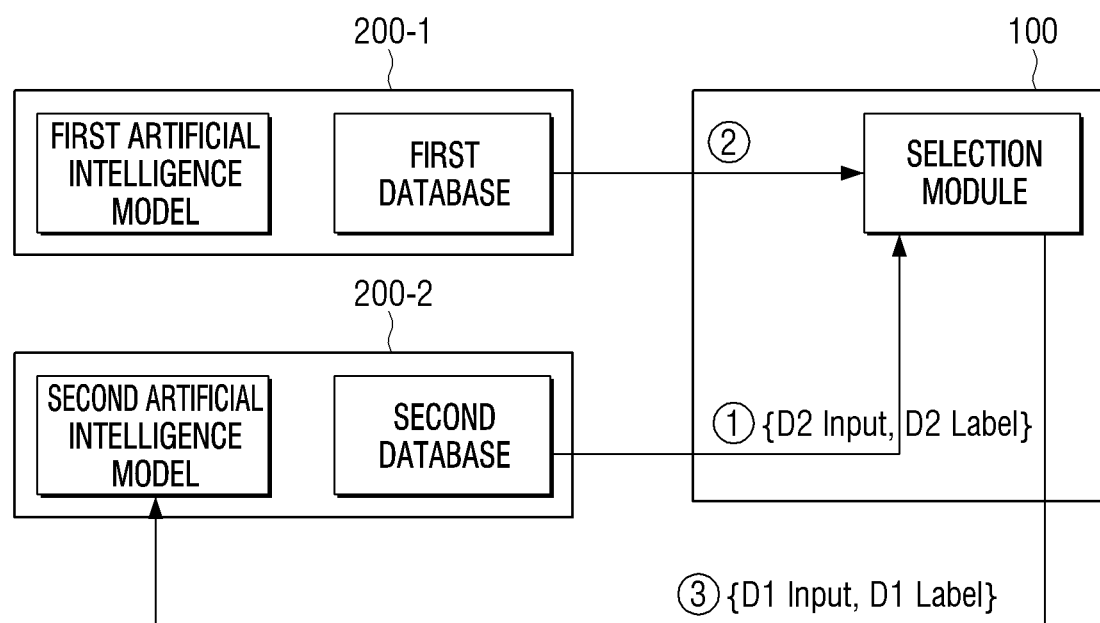
FIG. 4 is a diagram illustrating a data sharing method according to an embodiment of the disclosure.
Figure 5:
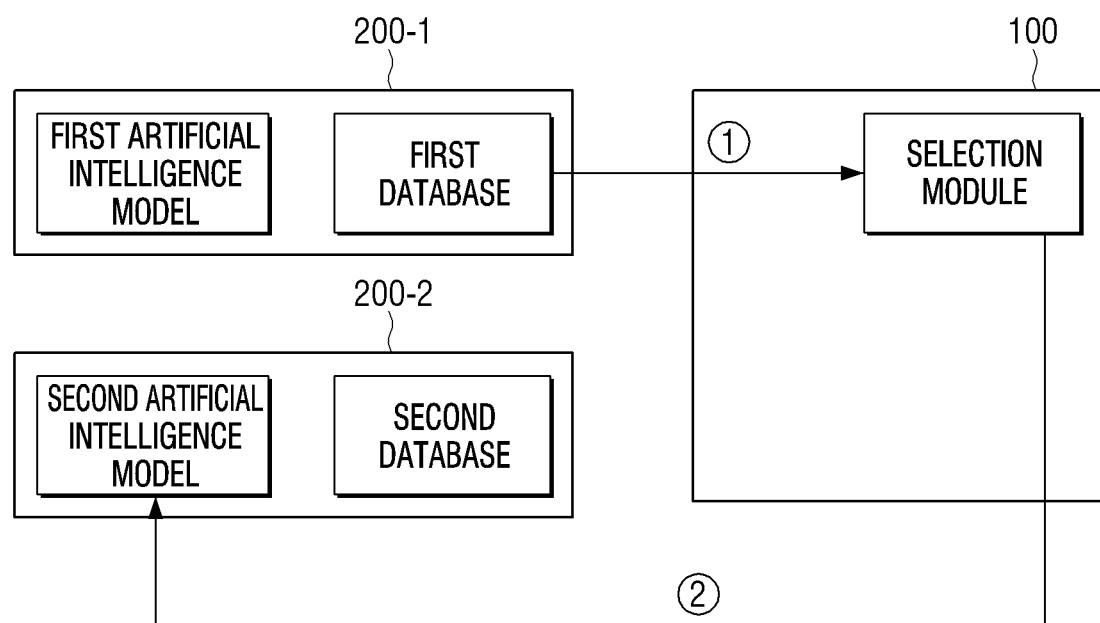
FIG. 5 is a diagram illustrating a data sharing method according to an embodiment of the disclosure.

FIGS. 4 and 5 are diagrams illustrating a data sharing method according to various embodiments of the disclosure.

Specifically, FIG. 4 is an diagram illustrating a method of selecting learning data necessary for training the second artificial intelligence model in case the first external electronic apparatus 200-1 is an external server storing various and vast learning data, and FIG. 5 is a diagram illustrating a method of selecting learning data necessary for training the second artificial intelligence model in case the first external electronic apparatus 200-1 is a personal terminal storing personalized learning data.

Referring to FIG. 4, the first external electronic apparatus 200-1 may include the first artificial intelligence model and the first database, and the second external electronic apparatus 200-2 may include the second artificial intelligence model and the second database. Here, the first database and the second database may store a plurality of learning data.

First, a selection module may acquire the first learning data similar to the second learning data (including an input value D2 Input and a label value D2 Label) including an input value and a label value among the plurality of learning data of the second database from the plurality of learning data of the first database. Specifically, as illustrated in FIG. 4, the selection module may compare at least one of the input value D2 Input or the label value D2 Label of the second learning data with at least one of the input value or the label value of each of the plurality of learning data of the first database, and select similar data.

The selection module may train the second artificial intelligence model as the first learning data including an input value D1 Input and a label value D1 Label similar to the second learning data as an input value.

As in the aforementioned method, the electronic apparatus 100 may train the second artificial intelligence model by acquiring learning data similar to each of the plurality of learning data of the second database from the first database.

Referring to FIG. 5, the electronic apparatus 100 may use all of the plurality of learning data of the first database as learning data for training the second artificial intelligence model. That is, unlike the case in FIG. 4, in case both of the learning data stored in the first external electronic apparatus 200-1 and the second external electronic apparatus 200-2 are learning data received from a user, the electronic apparatus 100 may train the second artificial intelligence model by using all of the plurality of learning data of the first database.

Figure 6:
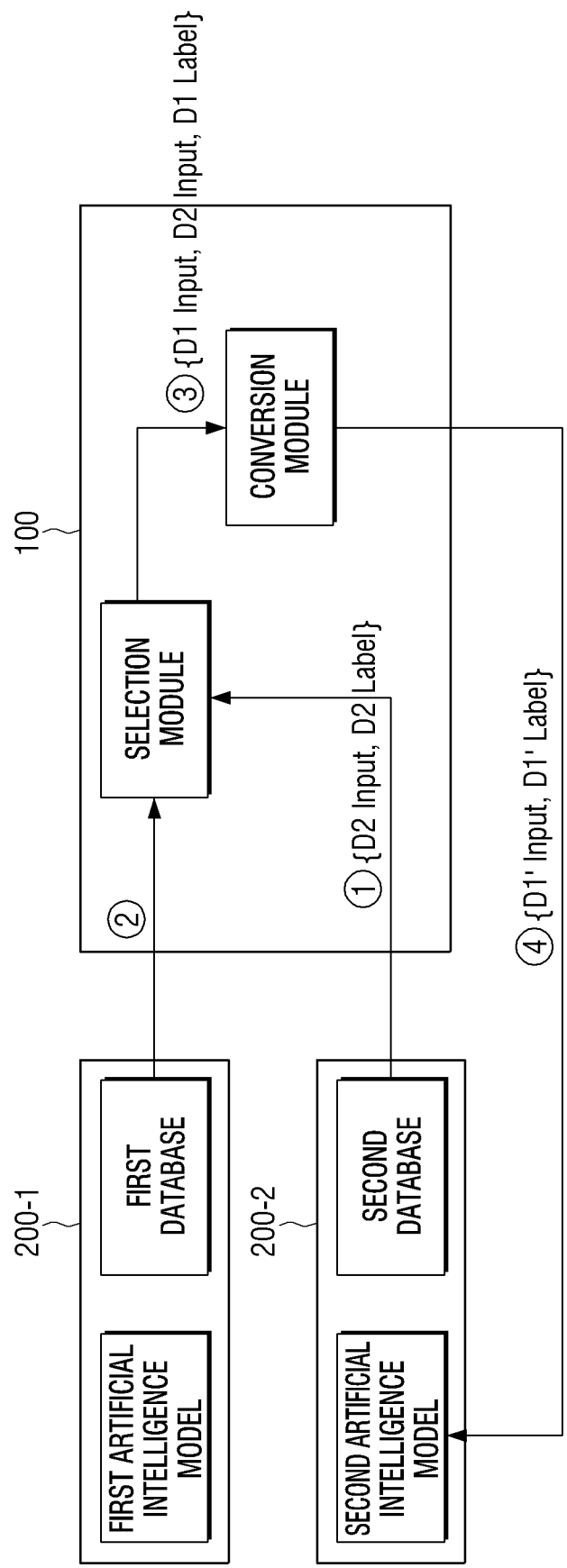
FIG. 6 is a diagram illustrating a method of converting learning data according to an embodiment of the disclosure.

FIG. 6 is a diagram illustrating a method of converting learning data according to an embodiment of the disclosure.

Referring to FIG. 6, the selection module may acquire the first learning data similar to the second learning data (including an input value D2 Input and a label value D2 Label) including an input value and a label value among the plurality of learning data of the second database from the plurality of learning data of the first database. Specifically, as illustrated in FIG. 4, the selection module may compare at least one of the input value D2 Input or the label value D2 Label of the second learning data with at least one of the input value or the label value of each of the plurality of learning data of the first database, and select similar data.

The selection module may acquire the first learning data including the input value D1 Input and the label value D1 Label similar to the second learning data, and a conversion module may acquire third learning data (an input value D1' Input and a label value D1' Label) based on the input value D1 Input, the input value D2 Input, and the label value D1. That is, as the third learning data, learning data appropriate for the second external electronic apparatus 200-2 may be acquired by converting the first learning data.

As an embodiment for conversion of learning data, in case the first learning data and the second learning data are data for training artificial intelligence models, the D1 Input and the D2 Input may be data related to a user voice received by each external electronic apparatus.

Specifically, the electronic apparatus 100 may add data for noises around the first external electronic apparatus to the second learning data (specifically, the D2 Input), and acquire third learning data (specifically, the D1' Input). For example, the electronic apparatus 100 may acquire data for the ambient noises of the first external electronic apparatus 200-1 according to the usage environment of the first external electronic apparatus 200-1, and add the acquired data for the ambient noises of the first external electronic apparatus 200-1 and the D2 Input in the time area. As another example, the electronic apparatus 100 may filter the D2 Input in the frequency area by using the frequency filter for the ambient noise environment of the first external electronic apparatus 200-1. As another example, the electronic apparatus 100 may acquire data for a non-voice section included in the D1 Input by using voice activity detection (VAD), and add data for the non-voice section and the D2 input in the time area. Here, VAD is a technology of dividing a portion where a user voice is included and a portion where a user voice is not included (a mute portion or a non-voice portion) in an input user utterance, and the electronic apparatus 100 may acquire third learning data by using the noise environment information included in the first external electronic apparatus 200-1 by using the non-voice portion.

As another example, the electronic apparatus 100 may acquire third learning data based on characteristic information of the first external electronic apparatus 200-1 and the second external electronic apparatus 200-2.

Specifically, in case characteristic information of the first external electronic apparatus 200-1 and the second external electronic apparatus 200-2 is specification information for the first external electronic apparatus 200-1 and the second external electronic apparatus 200-2, the electronic apparatus 100 may acquire third learning data in consideration of the difference between the specification information of the first external electronic apparatus 200-1 and the specification information of the second external electronic apparatus 200-2.

Alternatively, in case characteristic information of the first external electronic apparatus 200-1 and the second external electronic apparatus 200-2 is characteristic information related to noises input through the first external electronic apparatus 200-1 and the second external electronic apparatus 200-2, the electronic apparatus 100 may acquire third learning data by using the difference between the noise input into the first external electronic apparatus 200-1 and the noise input into the second external electronic apparatus 200-2.

Alternatively, in case characteristic information of the first external electronic apparatus 200-1 and the second external electronic apparatus 200-2 is distance information between the location of the first external electronic apparatus 200-1 and a location wherein a user voice was generated and the distance information between the location of the second external electronic apparatus 200-2 and a location wherein a user voice was generated, the electronic apparatus 100 may acquire third learning data based on the distance information between the location of the first external electronic apparatus 200-1 and a location wherein a user voice was generated and the distance information between the location of the second external electronic apparatus 200-2 and a location wherein a user voice was generated. For example, a case wherein a user voice is input into the first external electronic apparatus 200-1 in a short distance, and a user voice is input into the second external electronic apparatus 200-2 from a far distance can be assumed. In general, a characteristic exists which is that, in case a user voice is input from a far distance, in an audio signal received by an apparatus, a low frequency portion is emphasized, and in case a user voice is input in a short distance, in an audio signal received by an apparatus, a high frequency portion is emphasized. Accordingly, for converting an audio signal corresponding to a user voice received by the first external electronic apparatus 200-1 into an audio signal appropriate for the second external electronic apparatus 200-2, signal processing such as reducing the high frequency area of the audio signal corresponding to the user voice received by the first external electronic apparatus 200-1, and increasing the low frequency portion, etc. is needed. Thus, the electronic apparatus 100 may convert the third learning data in consideration of the distance information between the location of the first external electronic apparatus 200-1 and a location wherein a user voice was generated and the distance information between the location of the second external electronic apparatus 200-2 and a location wherein a user voice was generated, in consideration of the aforementioned matter. As described above, for converting the first learning data into the third learning data, the electronic apparatus 100 may use a frequency filter.

Meanwhile, the electronic apparatus 100 may convert all of the plurality of learning data of the first database to suit the characteristic information of the second external electronic apparatus 200-2, as described in FIG. 5. That is, in FIG. 6, an embodiment where data similar to the second learning data is acquired, and the acquired learning data is changed was described, but the disclosure is not limited thereto, and the electronic apparatus 100 can convert all learning data of the first database, without a process of acquiring learning data similar to the second learning data.

Figure 7:
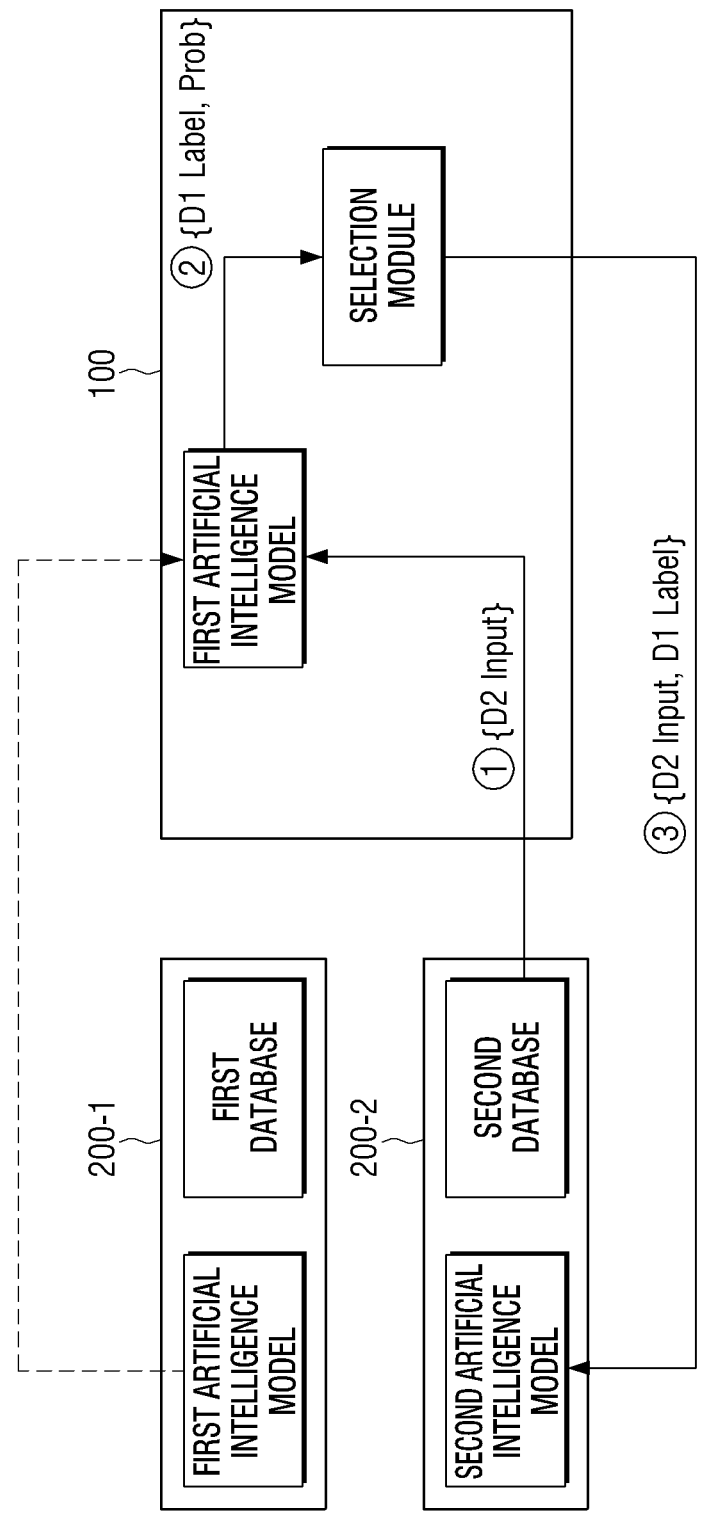
FIG. 7 is a diagram illustrating a method of acquiring learning data according to an embodiment of the disclosure.

FIG. 7 is a diagram for illustrating a method of acquiring learning data according to an embodiment of the disclosure.

Referring to FIG. 7, the first external electronic apparatus 200-1 is an electronic apparatus which received learning data for users, and was trained for a long time, and may include an artificial intelligence model which includes learning data related to a plurality of users and performed a lot of learning. The second external electronic apparatus 200-2 is, for example, an electronic apparatus that a user newly purchased, and may include an artificial intelligence model which has a small amount of learning data for the user, and which is not personalized.

In this case, as illustrated in FIG. 7, the electronic apparatus 100 may input the D2 Input received from the second external electronic apparatus 200-2 into the first artificial intelligence model as an input value, and output a result value. Here, when the D2 Input is input into the first artificial intelligence model, the electronic apparatus 100 may output a label value D1 Label for the D2 Input and a probability value Prob regarding whether the D1 Label is a label value for the D2 Input. In case the probability value Prob is equal to or greater than a predetermined value, the selection module may train the second artificial intelligence model based on fourth learning data including the D2 Input and the D1 Label.

That is, in case the second external electronic apparatus 200-2 is an electronic apparatus newly purchased, or an electronic apparatus of which internal information has been initialized, etc., the output value and the label value for the input data are not correct. Thus, the electronic apparatus 100 may acquire fourth learning data for the input value (D2

Input) of the second learning data by using the first artificial intelligence model wherein a lot of learning has proceeded.

Figure 8:
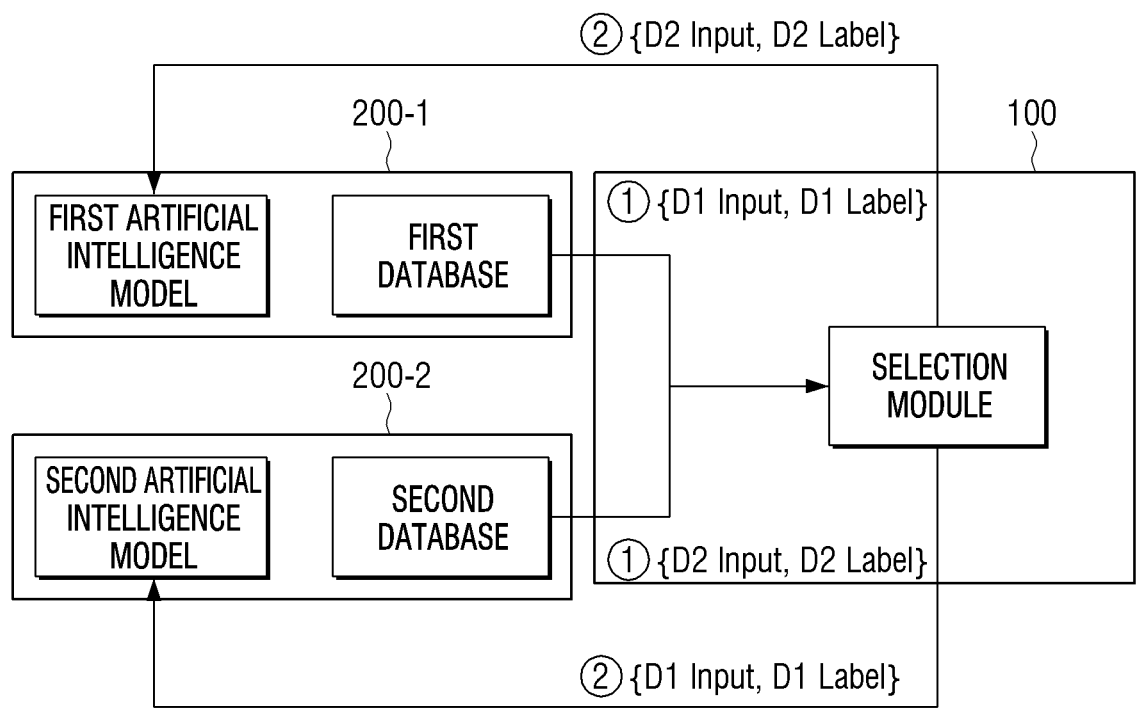
FIG. 8 is a diagram illustrating a method of sharing learning data according to an embodiment of the disclosure.
Figure 9:
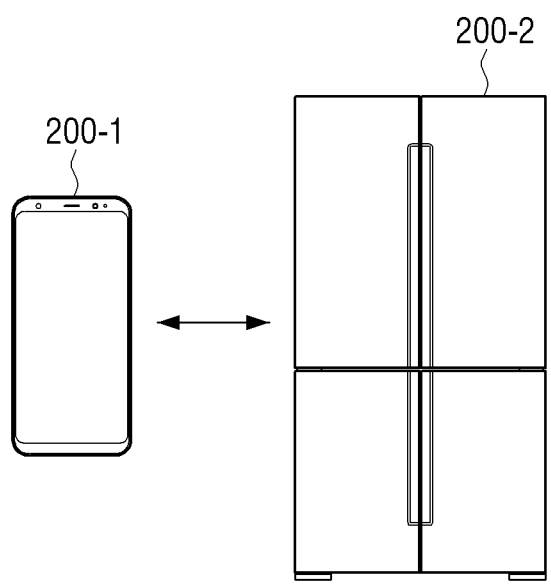
FIG. 9 is a diagram illustrating a method for a second external electronic apparatus to convert learning data according to an embodiment of the disclosure.

FIG. 8 is a diagram illustrating a method of sharing learning data according to an embodiment of the disclosure. FIG. 9 is a diagram illustrating a method for a second external electronic apparatus to convert learning data according to an embodiment of the disclosure.

Referring to FIGS. 8 and 9, in case the first artificial intelligence model and the second artificial intelligence model are artificial intelligence models for understanding of natural languages, the electronic apparatus 100 may train the second artificial intelligence model by using the first learning data having similar characteristics, and train the first artificial intelligence model by using the second learning data.

Specifically, the electronic apparatus 100 may acquire the first learning data, and acquire the second learning data having an identical or similar label to that of the first learning data from the plurality of learning data of the second database. Alternatively, it is obvious that the electronic apparatus 100 can acquire the second learning data, and acquire the first learning data having an identical or similar label to that of the second learning data from the plurality of learning data of the first database. Here, a label in an artificial intelligence model for understanding of a language may be a label related to the intent and entity of a user voice for a result of voice recognition.

Meanwhile, in the aforementioned various embodiments, descriptions were made based on the embodiment wherein the electronic apparatus 100 receives an artificial intelligence model and learning data of each of a plurality of external electronic apparatuses from the plurality of external electronic apparatuses and acquires learning data appropriate for another external electronic apparatus. However, the disclosure is not limited to the aforementioned embodiment, and the aforementioned functions and operations of the electronic apparatus 100 can be used in each of a plurality of external electronic apparatuses.

Specifically, as illustrated in FIG. 9, the aforementioned functions and operations of the electronic apparatus 100 may be performed by the first external electronic apparatus 200-1 or the second external electronic apparatus 200-2.

For example, the second external electronic apparatus 200-2 may receive a plurality of learning data stored in the first external electronic apparatus 200-1, and convert the received learning data into learning data appropriate for the artificial intelligence model of the second external electronic apparatus 200-2.

Specifically, the second external electronic apparatus 200-2 may receive a plurality of learning data stored in the first external electronic apparatus 200-1, and identify first learning data corresponding to the second learning data stored in the second external electronic apparatus 200-2 among the plurality of learning data received from the first external electronic apparatus 200-1.

Also, the second external electronic apparatus 200-2 may compare at least one of an input value or a label value included in the second learning data with an input value and a label value included in each of the plurality of learning data received from the first external electronic apparatus 200-1, and identify first learning data.

Then, the second external electronic apparatus 200-2 may train the second artificial intelligence model used by the second external electronic apparatus 200-2 based on the identified first learning data.

Specifically, the second external electronic apparatus 200-2 may receive characteristic information of the first external electronic apparatus 200-1, and convert the first learning data into third learning data based on the received characteristic information. Meanwhile, it is obvious that to the types of characteristic information and the conversion method, the same methods as the aforementioned various embodiments can be applied. That is, characteristic information may include at least one of characteristic information related to voice inputters included in the first external electronic apparatus 200-1 and the second external electronic apparatus 200-2, characteristic information related to noises input through the voice inputters of the first external electronic apparatus 200-1 and the second external electronic apparatus 200-2, or characteristic information related to the distance between a location wherein a user voice was generated and the first external electronic apparatus 200-1, and the distance between a location wherein a user voice was generated and the second external electronic apparatus 200-2.

FIG. 10 is a flow chart for illustrating a control method of an electronic apparatus according to an embodiment of the disclosure.

Referring to FIG. 10, the electronic apparatus 100 may receive an artificial intelligence model used by each of the first external electronic apparatus 200-1 and the second external electronic apparatus 200-2 and a plurality of learning data stored in each of the first external electronic apparatus 200-1 and the second external electronic apparatus 200-2 from the first external electronic apparatus and the second external electronic apparatus, at operation S1110. Further, the electronic apparatus 100 can receive characteristic information of the first external electronic apparatus 200-1 and the second external electronic apparatus 200-2 and store the information.

Also, the electronic apparatus 100 may identify first learning data corresponding to the second learning data received from the second external electronic apparatus 200-2 among the plurality of learning data received from the first external electronic apparatus 200-1, at operation S1120. Specifically, the electronic apparatus 100 may compare the input value and the label value of the first learning data with the input value and the label value of the second learning data and identify first learning data.

Then, the electronic apparatus 100 may train the artificial intelligence model used by the second external electronic apparatus 200-2 based on the acquired first learning data, at operation S1130. Here, the electronic apparatus 100 can train the second artificial intelligence model based on third learning data which is learning data converted from the first learning data to a form appropriate for the second external electronic apparatus 200-2.

The electronic apparatus 100 may transmit the trained artificial intelligence model to the second external electronic apparatus 200-2, at operation S1140. Through the aforementioned process, the second external electronic apparatus 200-2 may output a personalized result based on the second artificial intelligence model trained based on various personalized learning data.

Meanwhile, the term "part" or "module" used in the disclosure includes a unit consisting of hardware, software, or firmware, and it may be interchangeably used with terms such as logic, a logical block, a component, or a circuit. Also, "a part" or "a module" may be a component consisting of an integrated body or a minimum unit performing one or more functions or a portion thereof. For example, a module may consist of an application-specific integrated circuit (ASIC).

The various embodiments of the disclosure may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus 100). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g., a module or a program) may consist of a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed or omitted in a different order, or other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A control method of an electronic apparatus, the control method comprising:
receiving, from a first external electronic apparatus and a second external electronic apparatus, a first artificial intelligence model and a second artificial intelligence model used by the first and second external electronic apparatuses, respectively, and a plurality of learning data stored in the first and second external electronic apparatuses;
identifying first learning data, which corresponds to second learning data received from the second external electronic apparatus, among learning data received from the first external electronic apparatus;
receiving characteristic information of the second external electronic apparatus;
based on the first learning data and the characteristic information of the second external electronic apparatus, obtaining third learning data;
based on the third learning data, training the second artificial intelligence model; and
transmitting, to the second external electronic apparatus, the trained second artificial intelligence model.

2. The control method of claim 1, further comprising:
receiving first and second characteristic information of the first and second external electronic apparatuses, respectively;
based on the first characteristic information of the first external electronic apparatus and the second characteristic information of the second external electronic apparatus, converting the first learning data into the third learning data to train the second artificial intelligence model used by the second external electronic apparatus; and
based on the third learning data, training the second artificial intelligence model used by the second external electronic apparatus.

3. The control method of claim 2, wherein the identifying of the first learning data comprises:
comparing at least one of an input value or a label value included in the second learning data with an input value and a label value included in the learning data received from the first external electronic apparatus; and
based on a result of the comparing, identifying the first learning data.

4. The control method of claim 2,
wherein the second artificial intelligence model comprises an artificial intelligence model for voice recognition, and
wherein the plurality of learning data includes voice data, a label value of the voice data, and user information corresponding to the voice data.

5. The control method of claim 4, wherein the identifying of the first learning data comprises:
comparing at least one of second voice data, a second label value of the second voice data, or second user information corresponding to the second voice data included in the second learning data with at least one of first voice data, a first label value of the first voice data, and first user information corresponding to the first voice data included in the learning data received from the first external electronic apparatus; and
based on a result of the comparing, identifying the first learning data.

6. The control method of claim 4, wherein the first and second characteristic information includes at least one of characteristic information related to voice inputters included in the first and second external electronic apparatuses, characteristic information related to noises input through the voice inputters of the first and second external electronic apparatuses, or characteristic information related to distances between a location where a user voice was generated and locations of the first and second external electronic apparatuses.

7. The control method of claim 4, wherein the converting of the first learning data into the third learning data comprises converting voice data included in the first learning data by using a frequency filter.

8. The control method of claim 1, wherein the receiving of the first and second artificial intelligence models comprises:
based on a predetermined time condition, receiving the first and second artificial intelligence models used by the first and second external electronic apparatuses, respectively;
receiving the plurality of learning data from the first and second external electronic apparatuses; and
receiving first and second characteristic information of the first and second external electronic apparatuses, respectively.

9. An electronic apparatus comprising:
a memory;
a communicator; and
a processor configured to:
receive, via the communicator from a first external electronic apparatus and a second external electronic apparatus, a first artificial intelligence model and a second artificial intelligence model used by the first and second external electronic apparatuses, respectively, and a plurality of learning data stored in the first and second external electronic apparatuses,
identify first learning data, which corresponds to second learning data received from the second external electronic apparatus, among learning data received from the first external electronic apparatus,
receive, via the communicator, characteristic information of the second external electronic apparatus,
based on the first learning data and the characteristic information of the second external electronic apparatus, obtain third learning data,
based on the third learning data, train the second artificial intelligence model, and
transmit, via the communicator, the trained second artificial intelligence model to the second external electronic apparatus.

10. The electronic apparatus of claim 9, wherein the processor is further configured to:
receive, via the communicator, first and second characteristic information of the first and second external electronic apparatuses, respectively,
based on the first characteristic information of the first external electronic apparatus and the second characteristic information of the second external electronic apparatus, convert the first learning data into the third learning data to train the second artificial intelligence model used by the second external electronic apparatus, and
based on the third learning data, train the second artificial intelligence model used by the second external electronic apparatus.

11. The electronic apparatus of claim 10, wherein the processor is further configured to:
compare at least one of an input value or a label value included in the second learning data with an input value and a label value included in the learning data received from the first external electronic apparatus, and
based on a result of the comparing, identify the first learning data.

12. The electronic apparatus of claim 10,
wherein the second artificial intelligence model comprises an artificial intelligence model for voice recognition, and
wherein the plurality of learning data includes voice data, a label value of the voice data, and user information corresponding to the voice data.

13. The electronic apparatus of claim 12, wherein the processor is further configured to:
compare at least one of second voice data, a second label value of the second voice data, or second user information corresponding to the second voice data included in the second learning data with at least one of first voice data, a first label value of the first voice data, and first user information corresponding to the first voice data included in the learning data received from the first external electronic apparatus, and
based on a result of the comparing, identify the first learning.

14. The electronic apparatus of claim 12, wherein the first and second characteristic information includes at least one of characteristic information related to voice inputters included in the first and second external electronic apparatuses, characteristic information related to noises input through the voice inputters of the first and second external electronic apparatuses, or characteristic information related to distances between a location where a user voice was generated and locations of the first and second external electronic apparatuses.

15. The electronic apparatus of claim 12, wherein the processor is further configured to convert voice data included in the first learning data by using a frequency filter.

16. The electronic apparatus of claim 9, wherein the processor is further configured to, based on a predetermined time condition, receive, via the communicator, the first and second artificial intelligence models used by the first and second external electronic apparatuses, respectively, the plurality of learning data from the first and second external electronic apparatuses, and first and second characteristic information of the first and second external electronic apparatuses, respectively.

17. An electronic apparatus comprising:
a memory;
a communicator; and
a processor configured to:
receive, via the communicator from external electronic apparatuses, a plurality of learning data stored in the external electronic apparatuses,
identify first learning data corresponding to second learning data stored in the electronic apparatus among the plurality of learning data received from the external electronic apparatuses,
receive, via the communicator, characteristic information of a second external electronic apparatus,
based on the first learning data and the characteristic information of the second external electronic apparatus, obtain third learning data, and
based on the third learning data, train an artificial intelligence model.

18. The electronic apparatus of claim 17, wherein the processor is further configured to:
receive, from the second external electronic apparatus, a plurality of learning data stored in the second external electronic apparatus, and
identify first learning data, which corresponds to the third learning data received from the second external electronic apparatus, among learning data received from a first external electronic apparatus.

19. The electronic apparatus of claim 18, wherein the processor is further configured to:
compare at least one of an input value or a label value included in the second learning data with an input value and a label value included in the plurality of learning data received from the external electronic apparatuses, and based on a result of the comparing, identify the first learning data.

20. The electronic apparatus of claim 18, wherein the characteristic information of the electronic apparatus and the external electronic apparatuses comprises at least one of characteristic information related to voice inputters of the electronic apparatus and the external electronic apparatuses, characteristic information related to noises input through the voice inputters of the electronic apparatus and the external electronic apparatuses, or characteristic information related to distances between a location wherein a user voice was generated and locations of the electronic apparatus and the external electronic apparatuses.

* * * * *